(12) United States Patent
Öhman et al.

(10) Patent No.: US 7,514,137 B2
(45) Date of Patent: Apr. 7, 2009

(54) PACKAGING LAMINATE FOR A RETORTABLE PACKAGING CARTON

(75) Inventors: Peter Öhman, Lund (SE); Ib Leth, Kävlinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 73 days.

(21) Appl. No.: 10/363,467

(22) PCT Filed: Sep. 11, 2001

(86) PCT No.: PCT/SE01/01937

§ 371 (c)(1),
(2), (4) Date: Mar. 4, 2003

(87) PCT Pub. No.: WO02/22462

PCT Pub. Date: Mar. 21, 2002

(65) Prior Publication Data

US 2003/0180507 A1    Sep. 25, 2003

(30) Foreign Application Priority Data

Sep. 13, 2000    (SE) .................................. 0003245

(51) Int. Cl.
*B41M 5/00* (2006.01)
*B32B 27/14* (2006.01)
*B32B 3/00* (2006.01)
*B32B 7/00* (2006.01)
*B32B 27/06* (2006.01)

(52) U.S. Cl. .................. 428/195.1; 428/199; 428/207; 428/411.1; 428/512; 428/513

(58) Field of Classification Search ............. 428/195.1, 428/34.2, 446, 423.7, 480, 481, 341, 34.3, 428/159, 40.1, 199, 207, 411.1, 512, 513; 229/116

See application file for complete search history.

(56) References Cited

U.S. PATENT DOCUMENTS

| 3,885,730 | A |   | 5/1975 | Christensson |
| 4,105,806 | A |   | 8/1978 | Watt |
| 5,284,688 | A | * | 2/1994 | Hiatt ......................... 428/41.1 |
| 5,401,562 | A | * | 3/1995 | Akao ....................... 428/211.1 |
| 5,413,629 | A | * | 5/1995 | Yasui et al. ............... 106/31.15 |
| 5,527,622 | A | * | 6/1996 | Kato et al. ................. 428/481 |
| 6,165,574 | A | * | 12/2000 | Bentmar et al. ............ 428/36.7 |

(Continued)

FOREIGN PATENT DOCUMENTS

GB    1199623    *  7/1970

(Continued)

*Primary Examiner*—D. Lawrence Tarazano
*Assistant Examiner*—Camie S Thompson
(74) *Attorney, Agent, or Firm*—Buchanan, Ingersoll & Rooney PC

(57) ABSTRACT

A packaging laminate for a retortable packaging container or carton, comprising a core layer (11) and outer, liquid-tight coatings (12 and 13) on both sides of the core layer (11). The one (12) of the two outer coatings carries decorative artwork (14) of printing ink which is both mechanically and thermally protected by a layer (18) of lacquer applied on the coating (12) to make possible heat treatment at high humidity and temperature conditions of a packaging container produced from the packaging laminate (10), without the printing ink decorative artwork of the packaging container deteriorating in quality.

21 Claims, 1 Drawing Sheet

U.S. PATENT DOCUMENTS

| | | | |
|---|---|---|---|
| 6,173,554 B1 * | 1/2001 | Marbler | 53/412 |
| 6,361,847 B1 * | 3/2002 | Magnusson et al. | 428/68 |
| 6,444,317 B1 * | 9/2002 | Haruta et al. | 428/409 |
| 6,531,188 B1 * | 3/2003 | Maag et al. | 427/492 |
| 6,569,539 B2 * | 5/2003 | Bentmar et al. | 428/532 |
| 6,685,993 B1 * | 2/2004 | Hansson et al. | 427/551 |
| 2004/0023045 A1 * | 2/2004 | Andersson et al. | 428/461 |

FOREIGN PATENT DOCUMENTS

| | | | |
|---|---|---|---|
| JP | 10-195281 | * | 7/1998 |
| JP | 11181331 A | | 7/1999 |
| WO | WO96/29205 | | 9/1996 |
| WO | WO97/02140 | | 1/1997 |
| WO | WO9702140 | * | 1/1997 |
| WO | 98/16431 | | 4/1998 |
| WO | WO98/51493 | | 11/1998 |
| WO | WO9851493 | * | 11/1998 |
| WO | WO99/61340 | | 12/1999 |

* cited by examiner

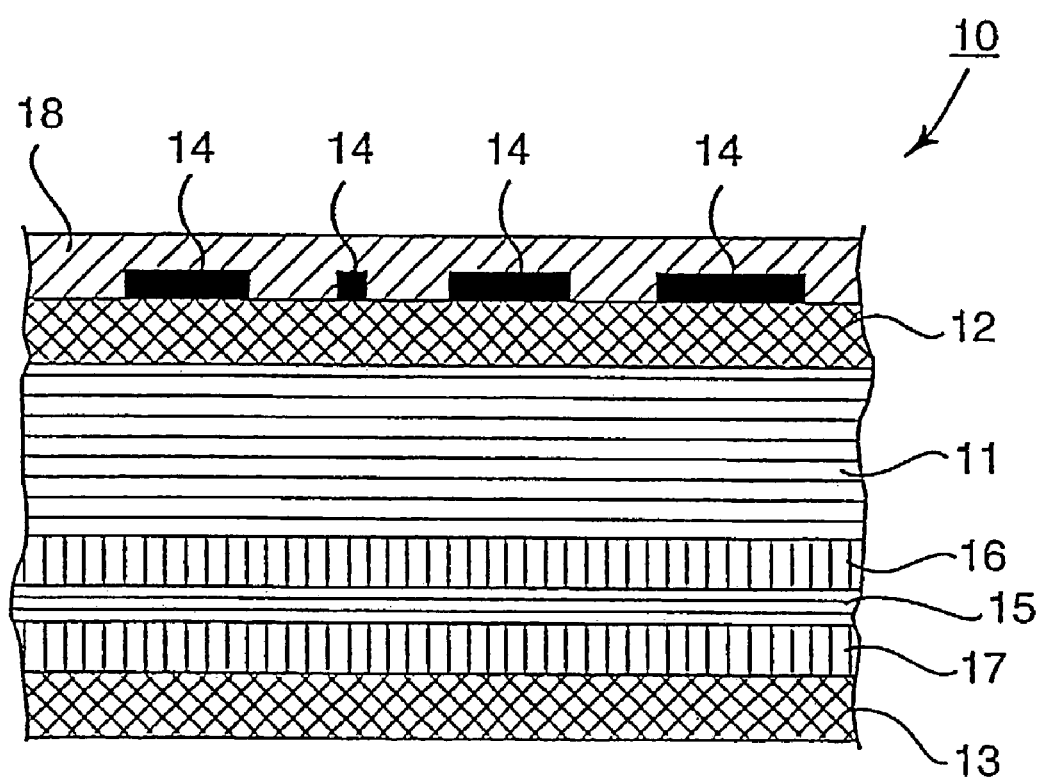

PACKAGING LAMINATE FOR A RETORTABLE PACKAGING CARTON

FIELD OF THE INVENTION

The present invention relates to a packaging laminate for a retortable packaging carton, comprising a core layer and a first plastic coating provided with printing ink artwork décor and disposed on one side of the core layer. The present invention moreover relates to a retortable packaging container or carton produced from the packaging laminate.

BACKGROUND OF THE INVENTION

A packaging laminate for a retortable packaging container or carton is known from, for example, international patent application carrying publication number WO97/02140. The prior art packaging laminate has a core layer of paper or paperboard and outer, liquid-tight plastic coatings on both sides of the core layer. The prior art packaging laminate may moreover have a gas barrier disposed between the core layer and one of the two outer plastic coatings in order to impart to the packaging laminate tightness properties against gases, in particular oxygen gas, if such is desirable.

The prior art packaging laminate according to WO97/02140 is produced by a conversion process in which a paper or paperboard web is coated on its one side with a first, outer plastic coating, and the other side of the web is provided with an aluminium foil (Alifoil) serving as gas barrier with the aid of a lamination layer which is extruded between the web and the Alifoil. The Alifoil is covered with a second, outer plastic coating by an outer lamination layer which is extruded between the web and the second plastic coating. In a subsequent printing operation, the web is provided with any optional decorative artwork of printing ink which is printed in repeated patterns on the first plastic coating of the web and immediately thereafter is dried or cured. In a later forming operation, the web is reformed into a tube in that both longitudinal edges of the web are united with one another in an overlap joint or seam at the same time as the tube is flat-folded and divided by transverse incisions in the regions between the recurring patterns of printing ink, for the formation of individual, flat-folded tubular packaging blanks.

From the flat-folded, tubular packaging blanks, the finished retortable packaging containers are produced with the aid of packaging machines of the type which form, fill and seal finished packages. The flat-folded packaging blank is first raised to an open tubular packaging carton which is sealed at its one end by a fold-forming and sealing operation. The packaging carton is filled with the desired contents, e.g. a food, through its other open end which, after the filling operation, is closed by a further fold-forming and sealing operation. The thus filled and sealed packaging container is then ready for a shelf-life extending heat treatment which is normally carried out in a retort.

A suitable heat treatment, or so-called retorting, is described in international patent application carrying publication number WO98/16431. In general, the packaging container is heated to a temperature within the range of approx. 70–130° C. The time for the complete treatment, including the time for heating and the time for cooling, should be sufficient to impart to the packed food a suitable combination of high Fo-value and low Co-value, as a person skilled in the art will be aware.

In such instance, the expression "Fo-value" relates to a corresponding time (min) which the food should be kept at a reference temperature (121° C.) for obtaining the same level of sterility, which the expression "Co-value" relates to a cooking value and is a corresponding time (min) which the food should be kept at a reference temperature (100° C.) in order to obtain the same level of cooking effect in all of its component ingredients.

A retortable packaging container or carton of the prior art packaging laminate is per se sufficiently mechanically configurationally stable to withstand the powerful stresses to which it is subjected during a heat treatment or retorting of the above-described type. However, it not seldom occurs that the printing ink decorative artwork of the packaging container may be affected and deteriorate and even totally loose its distinctive printing quality if it is subjected to extreme humidity and temperature stresses during the heat treatment.

Since a pristine, distinct printing decorative artwork is, for several obvious reasons, desirable and sought-for, not least in order to impart to the packaging container an attractive appearance which is readily recognised and appreciated on the part of the consumers, numerous attempts have been made to obviate the problem inherent in undesired affect on the printing ink decorative artwork in connection with the prior art retortable packaging containers or cartons.

One such attempt takes as its point of departure protecting the printed decorative artwork with the aid of a prefabricated plastic film which is applied on the plastic coating of the prior art packaging laminate provided with the decorative artwork in direct contact with the subjacent printing ink decorative artwork. Practical trials have, however, shown that not only is it difficult to achieve a desirable requisite adhesion between the printing ink and the additional plastic film, but also the plastic film has shown a tendency to loosen from the subjacent plastic coating by shearing in connection with a subsequent heat treatment or retorting of the packaging carton.

SUMMARY OF THE INVENTION

One object of the present invention is thus to realise a packaging laminate which is decorated with printing ink and which makes for the production of a retortable packaging container or carton without consequential printing ink-related problems of the type described above.

A further object of the present invention is to realise a packaging container produced from the packaging laminate which reliably retains the desired printing ink decorative artwork quality even though the packaging container has been, for the purposes of extending its shelf life, subjected to a subsequent heat treatment or retorting under high temperature and humidity conditions.

These and other objects and advantages will be attained according to the invention by a packaging laminate according to appended independent claim 1 and a retortable packaging container or carton according to appended independent claim 11. Further advantageous embodiments of the packaging laminate according to the present invention have been given the characterising features as set forth in appended subclaims 2 to 10.

The present invention thus provides a packaging laminate which has a core layer and a first plastic coating provided with printing ink decorative artwork on the one side of the core layer and which, for the purpose of protecting the printing ink decorative artwork against external action, has a transparent lacquer layer applied on the first plastic coating.

In comparison with, for example, a prefabricated plastic film, lacquer is a relatively economical material which may readily be applied as a well-functioning protective layer on a running material web using existing printing equipment. One particular advantage is that lacquer, as opposed to the prefabricated plastic film, may be applied selectively along only such areas of the web which had previously been provided with repeated patterns of printing ink, without the employment of complicated process-engineering equipment for continuously monitoring and guiding the lacquer in register with these patterns.

In addition to these production and process engineering advantages, lacquer also possesses other valuable advantages and properties as artwork protection for a retortable packaging container in comparison with, for example, a prefabricated plastic film as has previously been proposed in the art. A suitable lacquer for use in the present invention may, as opposed to a prefabricated plastic film, be bonded direct to the subjacent plastic coating provided with printing ink decorative artwork as well as to the printed decorative artwork with sufficiently high bonding strength in order reliably to withstand the high humidity and temperature stresses to which the packaging container is subjected at a later heat treatment or retorting operation. A suitable lacquer according to the present invention is further sufficiently mechanically strong to impart to the printing ink decorative artwork of the packaging container the requisite protection against scratching and abrasion during normal transport and handling of the packaging container. Moreover, a lacquer layer provides an extremely high gloss shine which contributes in improving the attractive appearance of the packaging container.

Examples of suitable lacquers for use in the present invention are commercially available humidity and heat-resistant lacquers which are selected from the group consisting of radiation-curable lacquers, water-based lacquers and alcohol-based lacquers. Preferably, use is made of a radiation curable lacquer which makes for extremely rapid and efficient curing of the applied lacquer layer. Examples of such radiation-curable lacquers are lacquers which may be cured by radiation with UV light or with electron radiation.

The applied lacquer layer may, as was mentioned above, be bonded with good adhesion both to the subjacent plastic coating and to the printing ink decorative artwork printed on the plastic coating and, according to the present invention, it has proved that the bonding strength between the lacquer layer and the printing ink decorative artwork may be improved by a suitable selection of printing ink with reference to the selected lacquer layer.

Suitable printing inks for use in the present invention include previously known printing inks, such as radiation-curable printing inks, acrylate-based printing inks, polyvinyl butyral-based printing inks and water-based printing inks, among which the radiation-curable printing inks are at present the most preferred printing inks, since they make for an extremely rapid and efficient curing.

Examples of such preferred radiation-curable printing inks are UV-curable cationic printing inks which, in combination with corresponding cationic UV-curable lacquers, make possible a very rapid curing of the UV-curable printing inks in one and the same curing operation, with the UV-curable lacquers employing the same UV radiation source. Another preferred combination of radiation-curable printing inks and radiation-curable lacquers is such printing inks and lacquers which are curable by radiation with electron radiation, which also makes for an extremely rapid curing of both the printing inks and the lacquers in one and the same curing operation employing a common electron radiation source.

BRIEF DESCRIPTION OF THE DRAWING

The present invention will now be described in greater detail hereinbelow, with reference to the accompanying Drawing which schematically shows a cross section of a packaging laminate according to the present invention.

DETAILED DESCRIPTION OF THE INVENTION

It should be observed that the present invention, in its broadest scope, is not restricted to the embodiment specifically shown on the Drawing, and that numerous alterations and modifications of both the packaging laminate and the packaging container produced from the packaging laminate will be obvious to a person skilled in the art, without departing from the inventive concept as this is defined in the appended claims.

The FIGURE thus shows a schematic cross section of a packaging laminate according to the invention. The packaging laminate 10 has a core layer 11 and outer, liquid-tight plastic coatings 12 and 13 on both sides of the core layer 11. The one, or first, liquid-tight plastic coating 12 has decorative artwork 14 of printing ink comprising symbols or figures of a decorative and/or informative nature directly printed on the surface of the liquid-tight plastic coating 12. Between the core layer 11 and the second liquid-tight plastic coating 13, the packaging laminate 10 has a material layer 15 serving as gas barrier which, via interjacent layers of binder or adhesive 16 and 17, is bonded to the core layer 11 and the second liquid-tight plastic coating 13, respectively.

The core layer 11 may consist of any suitably rigid, but foldable material whatever, but appropriately consists of paper or paperboard of conventional packaging quality.

The plastic in the liquid-tight coating 12 provided with decorative artwork may be a plastic which is selected from the group which consists of PE (polyethylene), PP (polypropylene) and PET (polyester), or mixtures thereof. Examples of a suitable polyethylene plastic may be HDPE (high density polyethylene) or LLDPE (linear low density polyethylene), examples of a suitable polypropylene plastic may be OPP (oriented polypropylene), and an example of a suitable polyester plastic may be amorphous PET (polyethylene terephthalate).

Preferably however, the liquid-tight coating 12 consists of a mechanical mixture of PP and PE which, in addition to superior tightness properties vis-à-vis liquid, also possesses sufficient humidity and heat resistance to withstand the extreme humidity and temperature conditions to which a packaging container produced from the packaging laminate 10 is subjected on heat treatment in a retort. An outer plastic coating consisting of a mechanical mixture of PP and PE moreover possesses superior printability at the same time as it makes possible a mechanically strong and liquid-tight seal by so-called thermosealing when the packaging laminate 10 is reformed into dimensionally stable, retortable packaging containers or cartons.

The thickness or quantity of the outer plastic coating 12 may vary within broad limits, but is in general 25–45 g/m$^2$.

Correspondingly, the plastic in the second liquid-tight plastic coating 13 may be selected from the group which consists of PE (polyethylene), PP (polypropylene) and PET (polyester), or copolymers thereof. Examples of a suitable polyethylene plastic may be HDPE (high density polyethylene), or LLDPE (linear low density polyethylene), and examples of a suitable polyester plastic may be amorphous PET (amorphous polyethylene terephthalate).

Preferably, the liquid-tight plastic coating 13 consists of a copolymer of PP and PE which is sufficiently humidity- and heat resistant to withstand the extreme humidity and temperature conditions to which a packaging container produced from the packaging laminate 10 is subjected in a heat treatment in a retort. A plastic coating consisting of a copolymer of PP and PE moreover makes for a mechanically strong and liquid-tight sealing of the packaging laminate 10 by so-called thermosealing when the packaging laminate 10 is reformed into finished retortable containers or cartons. The thickness or quantity of the outer plastic coating 13 may vary within broad limits, but is generally 25–35 g/m².

The material layer 15 serving as gas barrier may be an inorganic or an organic material. One example of a suitable inorganic material may be a metal foil, e.g. an aluminium foil (Alifoil), or a coating of silica oxide produced by plasma deposition, and examples of a suitable organic material may be a so-called barrier polymer of the EVOH type (copolymer of ethylene and vinyl alcohol).

Preferably, the material layer 15 consists of an aluminium foil which, in addition to its superior tightness properties against gases, in particular oxygen gas, also makes for sealing of the packaging laminate 10 by induction thermosealing, which is a simple, but rapid and efficient sealing method.

The printing ink in the printed decorative artwork 14 printed on the surface of the plastic coating 12 may, as was mentioned previously, be a printing ink which is selected from the group consisting of radiation-curable printing inks, acrylate-based printing inks, polyvinyl butyral-based printing inks and water-based printing inks, but is preferably a radiation-curable printing ink which makes for a practically immediate curing of the printing ink printed on the plastic coating 12. Examples of such radiation-curable printing inks are printing inks which may be cured by radiation with UV light.

In order to impart to the printed decorative artwork 14 of printing ink sufficient mechanical and physical protection so as to withstand the external stresses to which a packaging container produced from the packaging laminate 10 is subjected on heat treatment in a retort, the packaging laminate 10 according to the invention has a transparent layer 18 of lacquer applied above the plastic coating 12 provided with decorative artwork.

The lacquer in the printing ink-protective lacquer layer 18 of the packaging laminate is, as was mentioned previously, a lacquer which has been selected from the group consisting of radiation-curable lacquers, water-based lacquers and alcohol-based lacquers. Preferably, the lacquer layer 18 consists of a radiation-curable lacquer which makes for an extremely rapid and efficient curing of the applied lacquer layer 18. Examples of radiation-curable lacquers are such lacquers as may be cured by radiation with UV light or with electron radiation.

In one particularly preferred embodiment of the packaging laminate 10 according to the invention, the selected printing ink in the subjacent decorative artwork 14 and the selected lacquer in the lacquer layer 18 applied above the decorative artwork 14 are radiation-curable by radiation with UV light, which makes it possible that both the decorative artwork 14 of printing ink and the lacquer layer 18 can efficiently and extremely rapidly be cured simultaneously employing a common UV radiation source.

The thickness or quantity of the applied lacquer layer 18 may vary within broad limits, but generally lies within the range of 1–10 g/m² which is a fully sufficient coating quantity in order to give the subjacent printing ink decorative artwork 14 sufficient mechanical and physical protection to withstand the extreme humidity and temperature conditions to which a packaging container produced from the packaging laminate 10 is exposed on a heat treatment in a retort. A protective lacquer layer of this comparatively slight thickness moreover gives the printing ink decorative artwork of the retortable packaging container or carton sufficient mechanical protection against scratching and abrasion to withstand the outer stresses to which the retortable packaging container is subjected on normal transport and handling.

From a web of the packaging laminate 10 in FIG. 1, retortable packaging containers are produced according to the present invention in that the web is first reformed into a tube by both longitudinal edges of the web being united with one another in an overlap joint or seam, at the same time as the tube is flat-folded and divided by transverse incisions in the regions between recurring patterns of printing ink for obtaining individual tubular, flat-folded packaging blanks. The packaging blanks are raised to open tubular packaging cartons which are sealed at their one end by a fold-formation and sealing operation. The packaging cartons are filled with the desired contents, e.g. a food, through their other, open end which, after the filling operation, is closed by an additional fold-formation and sealing operation. The filled and closed packaging containers are thereafter ready for a shelf-life extending heat treatment which is normally carried out in a retort at extremely high humidity- and temperature conditions, as described above.

It will thus be apparent from the foregoing description that the present invention makes for the production of printing ink-decorated retortable packaging containers or cartons whose printing ink decorative artwork, in a simple manner and using only simple means, is given sufficient mechanical and physical protection to withstand the extreme humidity and temperature conditions to which the packaging containers are exposed on a shelf-life extending heat treatment in a retort.

The invention claimed is:

1. A packaging laminate used to produce packaging containers containing contents, comprising;
    a core layer;
    a first plastic coating provided with printing ink decorative artwork on one side of the core layer, wherein the printing ink decorative artwork is protected by a transparent lacquer layer applied above the first plastic coating;
    wherein the lacquer layer comprises a UV-curable lacquer;
    wherein the printing ink in the printing ink decorative artwork of the first plastic coating comprises a UV-cured printing ink;
    the lacquer layer being positioned at areas spaced from one another, the areas including areas of the first plastic coating at which the printing ink is applied;
    a second liquid-tight plastic coating on the other side of the core layer; and
    a gas barrier between the core and the second liquid-tight plastic coating.

2. The packaging laminate as claimed in claim 1, wherein the first plastic coating has its printing ink decorative artwork turned to face away from the core layer and in direct contact with the protective lacquer layer.

3. The packaging laminate as claimed in claim 1, wherein the lacquer layer is applied in a quantity of 1–10 g/m².

4. The packaging laminate as claimed in claim 1, wherein the UV-curable lacquer is a humidity and heat resistant lacquer.

5. The packaging laminate as claimed in claim 1, wherein the core layer is a paper or paperboard layer.

6. The packaging laminate as claimed in claim 1, wherein gas barrier is a metal foil, a coating of silicon dioxide or a EVOH type barrier.

7. A retortable packaging container, which is produced from a packaging laminate as claimed in claim 1.

8. The packaging laminate as claimed in claim 7, wherein the first plastic coating has its printing ink decorative artwork turned to face away from the core layer and in direct contact with the protective lacquer layer.

9. The packaging laminate as claimed in claim 7, wherein the lacquer layer is applied in a quantity of 1–10 g/m$^2$.

10. The packaging laminate as claimed in claim 7, wherein the UV-curable lacquer is a humidity and heat resistant lacquer.

11. The packaging laminate as claimed in claim 7, wherein the core layer is a paper or paperboard layer.

12. A retortable packaging container, which is produced from a packaging laminate as claimed in claim 7.

13. A retortable packaging container comprising:
a sealed container containing contents and able to withstand a shelf-life extending treatment under high temperature and humidity conditions in a retort, the sealed container being made of a packaging laminate comprised of a core layer and a first plastic coating on one side of the core layer, with printing ink decorative artwork applied to a surface of the first plastic coating, and a transparent lacquer layer covering the printing ink decorative artwork to protect the printing ink decorative artwork, wherein the printing ink in the printing ink decorative artwork is a UV-cured printing ink; and wherein the lacquer layer is positioned at areas spaced from one another, the areas including areas of the first plastic coating at which the printing ink is applied.

14. The retortable packaging container as claimed in claim 13, wherein the lacquer layer is UV-cured lacquer.

15. The retortable packaging container as claimed in claim 14, further comprising a second liquid-tight plastic coating on an opposite side of the core layer from the first liquid-tight plastic coating.

16. The retortable packaging container as claimed in claim 15, further comprising a second liquid-tight plastic coating on an opposite side of the core layer from the first liquid-tight plastic coating.

17. The retortable packaging container as claimed in claim 16, wherein the core layer is paper or paperboard layer.

18. The retortable packaging container as claimed in claim 13, further comprising a second liquid-tight plastic coating on an opposite side of the core layer from the first liquid-tight plastic coating.

19. The retortable packaging container as claimed in claim 13, further comprising a second liquid-tight plastic coating on an opposite side of the core layer from the first liquid-tight plastic coating.

20. The packaging laminate as claimed in claim 19, further comprising a gas barrier gas barrier between the core layer and the second liquid-tight plastic coating, wherein the gas barrier is a metal foil, a coating of silicon dioxide or a EVOH type barrier.

21. The retortable packaging container as claimed in claim 13, wherein the core layer is paper or paperboard layer.

* * * * *